(12) United States Patent
Wenger et al.

(10) Patent No.: US 12,158,359 B2
(45) Date of Patent: *Dec. 3, 2024

(54) SYSTEM AND METHOD TO MANAGE UTILITY METER COMMUNICATIONS

(71) Applicant: NAGRAVISION SARL, Cheseaux-sur-Lausanne (CH)

(72) Inventors: Joel Wenger, Etoy (CH); Corinne Le Buhan, Les Paccots (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,165

(22) Filed: Jul. 6, 2023

(65) Prior Publication Data

US 2023/0375368 A1     Nov. 23, 2023

Related U.S. Application Data

(63) Continuation of application No. 17/661,618, filed on May 2, 2022, now Pat. No. 11,733,061, which is a
(Continued)

(30) Foreign Application Priority Data

Aug. 30, 2011    (EP) .................................. 11179337

(51) Int. Cl.
    *G01D 4/00*     (2006.01)
(52) U.S. Cl.
    CPC .............. *G01D 4/002* (2013.01); *Y02B 90/20* (2013.01); *Y04S 20/30* (2013.01)
(58) Field of Classification Search
    None
    See application file for complete search history.

(56) References Cited

U.S. PATENT DOCUMENTS

| 5,079,715 A | 1/1992 | Venkataraman et al. |
| 5,974,369 A | 10/1999 | Radtke et al. |

(Continued)

FOREIGN PATENT DOCUMENTS

WO    WO 2008/086231    7/2008

OTHER PUBLICATIONS

International Search Report issued in International Application No. PCT/EP2012/066803 dated Nov. 6, 2012.
(Continued)

*Primary Examiner* — John F Mortell
(74) *Attorney, Agent, or Firm* — Oblon, McClelland, Maier & Neustadt, L.L.P.

(57)     ABSTRACT

A method for managing communications within a network comprising utility meters, each associated and connected to at least one utility management center through at least one intermediate data concentrator. A message is sent by a utility meter to the destination data concentrator. This message includes metering data measurement reported by said utility meter, its utility meter identifier, the destination data concentrator identifier and the management center identifier. Then, on the basis of several metering data measurements, a metering counter differential consumption value is calculated by difference of two metering counter consumption indexes measured by the utility meter within a time period interval. Then, a report containing at least the metering counter differential consumption value is sent from the destination data concentrator towards the utility management center to which said utility meter is associated.

8 Claims, 1 Drawing Sheet

Related U.S. Application Data continuation of application No. 17/204,828, filed on Mar. 17, 2021, now Pat. No. 11,359,933, which is a continuation of application No. 16/887,424, filed on May 29, 2020, now Pat. No. 10,982,972, which is a continuation of application No. 16/685,241, filed on Nov. 15, 2019, now Pat. No. 10,724,875, which is a continuation of application No. 14/342,270, filed as application No. PCT/EP2012/066803 on Aug. 30, 2012, now Pat. No. 10,520,332.

(60) Provisional application No. 61/528,822, filed on Aug. 30, 2011.

(56) References Cited

U.S. PATENT DOCUMENTS

| | | |
|---|---|---|
| 6,006,212 A | 12/1999 | Schleich et al. |
| 6,907,401 B1 * | 6/2005 | Vittal .................... G06Q 30/06 |
| | | 705/26.35 |
| 7,627,283 B2 * | 12/2009 | Ratiu .................... H04W 52/46 |
| | | 340/5.91 |
| 2005/0131583 A1 | 6/2005 | Ransom |
| 2005/0240540 A1 | 10/2005 | Borleske |
| 2008/0068213 A1 | 3/2008 | Cornwall et al. |
| 2008/0177678 A1 * | 7/2008 | Di Martini ............. G06Q 10/06 |
| | | 705/412 |
| 2010/0026517 A1 | 2/2010 | Cumeralto |
| 2010/0176967 A1 | 7/2010 | Cumeralto et al. |
| 2011/0050456 A1 | 3/2011 | Cornwall et al. |
| 2013/0300577 A1 | 11/2013 | Cumeralto et al. |

OTHER PUBLICATIONS

Written Opinion issued in International Application No. PCT/EP2012/066803 dated Nov. 6, 2012.

Brazilian Office Action issued Dec. 26, 2019 in Brazilian Patent Application No. 112014004855-0 (with English translation), 7 pages.

* cited by examiner

| Start time | End time | Tariff |
|---|---|---|
| 22:00 | 06:00 | 0.15 |
| 06:00 | 09:00 | 0.25 |
| 09:00 | 12:00 | 0.15 |
| 12:00 | 14:00 | 0.20 |
| 14:00 | 17:00 | 0.15 |
| 17:00 | 22:00 | 0.25 |

Table 1 – Utility provider P1 tariff table

| Start time | End time | Tariff |
|---|---|---|
| 22:30 | 05:00 | 0.10 |
| 05:00 | 22:30 | 0.20 |

Table 2 – Utility provider P2 tariff table

SYSTEM AND METHOD TO MANAGE UTILITY METER COMMUNICATIONS

CROSS-REFERENCE TO RELATED APPLICATIONS

This application is a Continuation of U.S. application Ser. No. 17/661,618, filed May 2, 2022, which is a Continuation of U.S. application Ser. No. 17/204,828, filed Mar. 17, 2021, which is a Continuation of U.S. application Ser. No. 16/887,424, filed on May 29, 2020, now patented as U.S. Pat. No. 10,982,972, issued on Apr. 20, 2021, which is a Continuation of U.S. application Ser. No. 16/685,241, filed Nov. 15, 2019, now patented as U.S. Pat. No. 10,724,875, issued Jul. 28, 2020, which is a Continuation of U.S. application Ser. No. 14/342,270, filed Feb. 28, 2014, now patented as U.S. Pat. No. 10,520,332, issued Dec. 31, 2019, which is a National Stage of International Application No. PCT/EP2012/066803, filed Aug. 30, 2012, which claims priority to European Application No. EP 11179337.8, filed Aug. 30, 2011 and to U.S. Provisional Application No. 61/528,822, filed Aug. 30, 2011. The entire contents of each of these documents are incorporated herein by reference.

TECHNICAL FIELD

This invention concerns the field of utility meters that are monitored and managed from at least one utility management center through at least one intermediate data concentrator in a communication network.

BACKGROUND ART

The on-going deregulation in worldwide energy distribution markets is driving the need for smart utility distribution grids and smart meters, enabling both utility providers and consumers to monitor the detailed consumption of an end user at any time through open communication networks. The energy market is particularly concerned as of today but related issues are also relevant to other utility markets such as water or gas.

While a number of legacy meters already implement some point-to-point Automated Metering Reading (AMR) protocols using for instance standard optical or modem interfaces, they are not able to interact with either the end user home area network devices or the remote utility monitoring facilities using wireless or power line communication networks. The industry answer to this regulatory requirement in the next decade will therefore consist in swapping the legacy meters for so-called smart meters.

Smart meters enable utility providers to monitor the detailed consumption of an end user at any time through open communication networks. The consumption measurement sampling granularity can then be much finer than in legacy systems where the meters were manually controlled about once a year. It is also possible to support multiple tariffs from different providers and adapt them much more frequently in accordance with the finer measurement periods.

From the utility provider perspective, as there will be no more local measurement and physical control of the meter functionality by authorized personnel, the smart metering architecture needs careful design to ensure secure, tamper resistant and trusted data collection and transmission from the smart meters to the provider utility services facility. Various solutions can be defined based on state of the art cryptography protocols and a key management system under the control of the utility provider. Those solutions typically require the smart meter to generate its measurement reporting messages specifically for a given utility provider. In a deregulated market where the smart meter is able to negotiate its tariffs with multiple providers, this results in increased bandwidth and processing needs as well as tamper resistant design complexity, manufacturing costs and maintenance costs for the utility meters.

The document US 2008/0068213 discloses automatic meter reading systems for receiving standard consumption messages from encoder-receiver-transmitter devices located at the end user. To this end, these devices communicate with reading systems that periodically collect reading of residential gas, electric or water meters by using RF communications. Each encoder-receiver-transmitter device is uniquely identifiable so that its information can be properly associated with the corresponding customer account for billing purposes. The encoder-receiver-transmitter devices operates in a low-power standby mode during a majority of the time and it is provided with a timer which operates to periodically wake up the device so that it enters into an active operating mode.

The document U.S. Pat. No. 5,974,369 discloses an energy management system, in particular a recording node for receiving energy-related consumption meter data for calculating consumption amount and consumption rate for a particular time interval and for storing such information. Price data may be received at the recording node from an external source, e.g. over a network, such as a distributed network, which network may include the recording node. Pricing information might be updated any time a price change is implemented or projected. Service provider can receive previously accumulated consumption values and associated prices for past consumption intervals, for billing purposes over network. Data calculated by the recording node is available for reading by any authorized nodes on network or by other authorized external devices.

However, while keeping in mind that reporting data refers simultaneously to millions of utility meters, none of these documents suggests means for optimizing as far as possible the management of exchanged data in order to save bandwidth and computing resources. Besides, these documents merely suggest exchanging communications through a known network without taking care to prevent hacking and tampering caused by certain malicious persons.

From a security point of view, it is difficult to implement a powerful system for exchanging data, metered by a huge quantity of utility meters, which is fully tamper-proof against hackers. For instance, it is not reliable to implement a single cryptography system for reporting all utility meters given that such a system would require, for all these meters, a shared key that would be difficult to keep secret. As taught by the prior art, it is much easier to implement a security system by using physical access controls in order to monitor sensitive devices, for instance by installing locked gates and video monitoring cameras.

There is therefore a need for a more flexible smart metering network topology to optimize the smart metering operations, communications, and security.

SUMMARY

A metering reporting communication method utilizes at least one data concentrator proxy located as intermediate device between the utility meter and the utility provider. More particularly, a method for managing utility meter communications within a network comprising a plurality of utility meters, each associated and connected to at least one utility management center through at least one intermediate data concentrator, each utility meter being identified by a utility meter identifier and being adapted to produce and send utility meter messages to a destination data concentrator identified by a data concentrator identifier, each destination data concentrator being adapted to produce and send reports to said management center, the latter being identified by a management center identifier, the method comprising the steps of:

sending a utility meter message from a utility meter to the destination data concentrator, this utility meter message including: a metering data measurement reported by said utility meter, the utility meter identifier, the destination data concentrator identifier and the management center identifier;

determining, on the basis of several metering data measurements, a metering counter differential consumption value calculated by difference of two metering counter consumption indexes measured by said utility meter within a certain time period interval;

sending, from the destination data concentrator towards the utility management center to which said utility meter is associated, a report containing at least the metering counter differential consumption value.

The present invention also refers to a system able to implement the above mentioned method.

BRIEF DESCRIPTION OF THE DRAWINGS

The present invention will be better understood thanks to the attached figures in which.

DETAILED DESCRIPTION

Figures 1, 2:
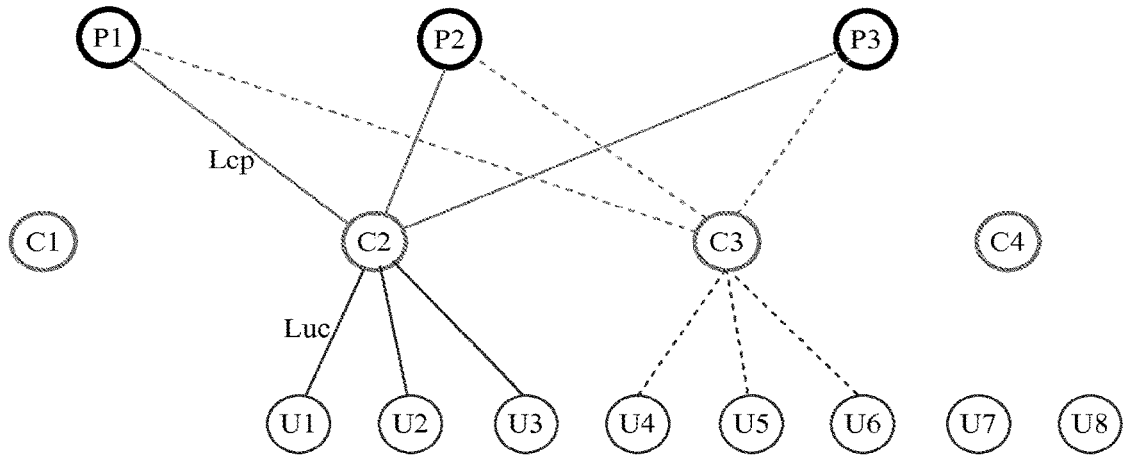
FIG. 1 shows a schematic illustration of a star-shaped network comprising end user utility meters, data concentrators and utility provider management centers.
FIG. 2 shows tariffs tables of utility providers.

The proposed solution comprises a data concentrator which is connected both to the smart meter and to a number of utility providers.

FIG. 1 illustrates one possible smart grid network topology, based on a star-shaped network of subset of end user utility meters U1, U2, U3, which are preferably directly connected to at least an intermediate data concentrator C2. This data concentrator being at its turn connected to at least one utility provider management center. The concentrator is typically co-located with the low-voltage utility distribution to a neighborhood and monitors up to several thousands of utility meters. In a deregulated utility market, the data concentrator C2 can be further connected to multiple utility providers P1, P2, P3 who are offering competing utility delivery offerings to the end user (FIG. 1).

Each utility management center P1, P2, P3 implements various utility management processes such as data management billing, load management and outage control, and queries and controls the data concentrators C1, C2, C3, C4 accordingly through the smart grid global communication network links Lpc.

Each data concentrator C1, C2, C3, C4 comprises functional components in charge with enforcing meter usage monitoring and reporting to the utility management center by means of secure communications with the individual meters through the local communication network links Luc on the one hand and with the utility providers management centers through the global smart grid network links Lcp on the other hand.

Each communication network link Lcp, Luc from FIG. 1 is built over a utility metering communication physical network, such as, but not limited to, a cable network, the power line wire, a wireless network, or a combination thereof, and employs a communication networking protocol, such as, but not limited to, Internet Protocol (IP) v4 or v6. On top of those networks, communication messaging for smart grids and smart meters is largely inspired by the telecommunication industry and subject to emerging standardization by international committees such as ANSI or IEC.

In a deregulated market, each end user can choose its preferred utility provider. For instance utility provider P3 is selected for utility meters U1 and U3 while utility provider P1 is chosen for utility meter U2. As utility offerings evolve towards a finer granularity and more frequent renewal of the tariffs, the utility meters have to process them accordingly and report their utility consumption at a higher rate than before, for instance every 15 minutes. This overloads both the limited meter processing power and the communication network between the utility providers and the utility meters.

This problem is avoided by a distributed computing system in which the data concentrator C establishes secure communications with each utility meter U, receives the regular utility consumption reports $DTup_{u,c}$ from each utility meter U, and computes a consolidated report $RTup_{u,p}$ for the utility provider P associated with said utility meter U. The advantage of this solution is that the utility meter only needs to establish, encrypt and sign one $DTup_{u,c}$ message for the data concentrator C to report its consumption without having to bear the detailed tariff computation, which evolves over time, requires specific technical resources and needs frequent updates. The utility meter message $DTup_{u,c}$ typically comprises at least an information relating one time and date DT and the metering counter consumption index CPT measured by the utility meter U at this time and date DT, or the metering counter differential consumption value $\Delta$CPT measured between the former transmitted time and date DTprev and the current time and date DTcurr. In a simpler mode of implementation where the utility meter and the data concentrator communicate synchronously, i.e. on the basis of synchronized clocks where one clock is located within the utility meter and the other within the data concentrator, only the utility meter consumption index is transmitted to the data concentrator which is in charge with measuring the corresponding date and time. However, it should be noted that these two clocks do not need to have the same time basis, for instance the clock located within the data concentrator could be a common clock, whereas the clock of the utility meter could be merely a count-down or a means able to produce pulses. In a further alternative, the utility meter could transmit only its consumption index to the data concentrator, only on request from the latter. For the sake of clarity, it should be noted that the word "index" refers to a number that is counted by the utility meter. For instance, this number can relate to a consumption quantity expressed in KW/h or in $m^3$ or in any other unit depending on the purpose for which the utility meter is used (i.e. whether it is used for metering electricity, water, gas, etc. . . . ).

In order to identify their source and their destination in an open communication network, the $DTup_{u,c}$ message also includes the source utility meter identifier Uid, the destination data concentrator identifier DCid, and the utility provider identifier Pid. The latter identifiers may be an integral value uniquely associated with the equipment at manufacturing time, a network address identifier, or any combination thereof.

In order to ensure the integrity of the utility meter messages, they can be further signed so that the data concentrator authenticates that the metering report comes from a genuine utility meter source. In order to ensure the confidentiality of the utility meter messages as desired (for instance to ensure end user consumption data privacy), they can also be encrypted so that the utility meter data is only accessible by the authorized data concentrator destination.

In terms of security design, most smart grid standards require the establishment of a Public Key Infrastructure (PKI) where each node in the network is associated with a pair of public and private asymmetric cryptography keys, for instance a RSA key pair, and a chain of public key certificates signed by a trusted central authority, for instance X.509 certificates. In a simple implementation corresponding to the grid topology of FIG. 1, in order to report its metering data measurement DTup within a utility meter message $DTUP_{u,c}$, the utility meter U1 generates a random payload key Kp, encrypts it with the public key KpubC2 of the data concentrator C2, and encrypts and signs the data measurement DTup by means of Kp. It transmits (Kp)KpubC2 and (DTup) Kp in one or several messages to the data concentrator C2, which decrypts the Kp value by means of its unique, secret private key KprivC2, and then the payload data DTup by means of the formerly decrypted Kp key. In a more optimized implementation, a Secure Authenticated Channel (SAC) can be negotiated by the utility meter and the data concentrator to establish a longer term shared session key Ks. This session key Ks can then be used similarly to the former payload key Kp but repeatedly, for a certain period of time, to enforce communication message integrity and confidentiality in the point-to-point transmission between the utility meter and the data concentrator. The available offerings from the utility providers are represented by tariffs tables which can be sent by the utility providers P1-P3 to each data concentrator C1-C4 connected to these providers. In order to disclose these tables in a secured manner, these tables are sent within secured utility provider messages. Such a message can be secured by several manners. A first manner is to encrypt the message according to a symmetric or a private/public scheme. A second manner to secure this message can be obtained by signing this message in view to protect its content against any modification. This can be done by the sender through a one-way function (e.g. a hash function) applied to the message to be sent in order to get a hash value which is then encrypted by means of the private key of the sender. This encrypted hash value (corresponding to a signature) can be decrypted by the recipient by using the public key of the sender. Besides, this public key can be also authenticated by a certificate from a certificate authority. Another way to secure the message is to send a signed and encrypted message. Such a message provides a double protection given that it is protected, on the one hand against any easy reading by its encryption layer, and on the other hand against any tampering of its content thanks to the signature and the certificate. Thus, the authenticity and the integrity of the message can be advantageously combined to its encryption. Applying encryption and/or signing operations can be performed with any message, e.g. with utility messages or data concentrator messages. A tariff table, as represented in FIG. 2, provides a consumption unit invoicing value, for instance 0.15 cent per kw/h, which is mapped to a date and time period interval [DT1,DT2], for instance from DT1=22:00 to DT2=22:30:00 every day.

The data concentrator receives at regular intervals, for instance every 15 minutes, a utility meter message $DTup_{u,c}$ comprising metering data measurement DTup sent from each connected utility meter, decrypts it as relevant, and verifies its signature. If the message is authenticated, the data concentrator derives the consumption values from the utility meter in the invoicing period interval [DT1, DT2] from the succession of transmitted counter values CPT, or differential values ΔCPT, defined as metering data measurement DTup. If the differential value CPT has not yet been determined by the utility meter itself, the data concentrator derives the difference $\Delta CPT_{1,2}$ between the metering counter value CPT2 at a given time and date DT2 and the metering counter value CPT1 at a given time and date DT1. Thus, depending on the technical nature of the utility meter and its predefined task, the destination data concentrator has to determine the differential consumption value ΔCPT on the basis of several metering data measurements, typically at least two metering data measurements. More generally, the metering data measurement DTup may comprise different data namely either:

at least one metering counter consumption index CPT; or at least one metering counter consumption index CPT together with a time and date DT information resulting from a clock readable by said utility meter and corresponding to the moment where the counter consumption index has been measured; or directly the metering counter differential consumption value ΔCPT, e.g. if the utility meter is able to perform such a computation task.

In one embodiment, the data concentrator C then transmits the calculated difference $\Delta CPT_{1,2}$ to the utility provider P associated with the utility meter U. Thus, at each time a difference ΔCPT has been determined for a time period interval ΔDT ([DT2-DT1]), this value ΔCPT is sent from the destination data concentrator to the proper utility management center, i.e. the utility management center associated to the utility meter from which comes the metering data measurement DTup.

In another embodiment, the data concentrator C collects and calculates for a utility meter, a sequence (i.e a plurality) of values $\Delta CPT_{1,2}$, $\Delta CPT_{2,3}$, $\Delta CPT_{3,4}$ for a given reporting period of time ΔRT ([RTa,RTb]), for instance one day, one week or one month, and records them into a memory of the data concentrator, e.g. under a utility meter consumption invoicing report $MRup_{u,c,p}$. After the end of the reporting period of time RTb, the data concentrator C in the proposed distributed computing system establishes secure communications with the utility provider P associated with each utility meter U and transmits the collected consumption values ΔCPT to the utility provider P, e.g. by sending the utility meter consumption invoicing report $MRup_{u,c,p}$. The advantage of this solution is that the utility provider only needs to process one utility meter consumption invoicing report message $MRup_{u,c,p}$ for each reporting period of time, regardless of the actual fine gain granularity of the utility meter consumption reporting and regardless of the actual tariff updates during this period.

In order to identify their source and their destination in an open communication network, the utility meter consumption invoicing report message $MRup_{u,c,p}$ also includes the source utility meter identifier Uid. Preferably, it further includes the destination data concentrator identifier DCid and the utility provider identifier Pid. These identifiers may be an integral value uniquely associated with the equipment at manufacturing time, a network address identifier, or any combination thereof.

In order to ensure the integrity of the utility meter consumption invoicing report message $MRup_{u,c,p}$, it can be signed so that the utility provider authenticates that the metering report comes from a genuine data concentrator source. In order to ensure the confidentiality of the utility meter consumption as desired (for instance to ensure end user privacy), the utility meter consumption invoicing report message $MRup_{u,c,p}$ can also be encrypted so that the utility meter data is only accessible by the authorized utility provider.

In a further embodiment, the data concentrator C collects and calculates, for a plurality of utility meters which are all associated with a single utility management center (e.g. for each utility meter U1, U3 associated with utility provider P2), a sequence of values $\Delta CPT\_U1_{1,2}$, $\Delta CPT\_U3_{1,2}$, $\Delta CPT\_U1_{2,3}$, $\Delta CPT\_U3_{2,3}$, $\Delta CPT\_U1_{3,4}$, $\Delta CPT\_U3_{3,4}$ for a given reporting period of time [RT1,RT2] (e.g. one day, one week or one month) and records them, together with the utility meter identifier Uid to which each of these value refers, into a memory of the data concentrator, e.g. under a consolidated utility meter consumption invoicing report $CR_{c,p}$. After the end of the reporting period of time RT2, the data concentrator C in the proposed distributed computing system establishes secure communications with the utility provider P3 associated with the subset of utility meters U1, U3 and transmits the consolidated utility meter consumption invoicing report $CR_{c,p}$ to the utility provider P3. The advantage of this solution is that the utility provider only needs to process one consolidated consumption invoicing report message $CR_{c,p}$ for each data concentrator instead of each utility meter, for each period of time. Accordingly, the communications are optimized while saving bandwidth and computing resources.

In order to identify their source and their destination in an open communication network, the consolidated consumption invoicing report message $CR_{c,p}$ also includes a list of the source utility meters identifiers Uid, the destination data concentrator identifier DCid, and the utility provider identifier Pid. These identifiers may be an integral value uniquely associated with the equipment at manufacturing time, a network address identifier, or any combination thereof.

In order to ensure the integrity of the consolidated consumption invoicing report message $CR_{c,p}$, it can be signed so that the utility provider authenticates that the metering report comes from a genuine data concentrator source. In order to ensure the confidentiality of the utility meters consumption as desired (for instance to ensure end user privacy), the utility meter consumption invoicing report message $CR_{c,p}$ can also be encrypted so that the utility meters data is only accessible by the authorized utility provider.

By grouping the data into one message, such as a consolidated utility meter consumption invoicing report, it is not possible to implement a single cryptography system for reporting all utility meters given that such a system would require a shared key for all these meters.

In the case where the network between the data concentrator and the utility meter is not reliable, it may occur that a utility metering message DTup is lost. In that configuration it is preferable to transmit, as metering data measurement DTup, the counter index CPT rather than a relative differential value $\Delta CPT$, so that the data concentrator can still interpolate the missing consumption value from the last received one and the current one and derive an acceptable consumption invoice accordingly.

Given that providers, intermediate data concentrators C1-C4 and utility meters U1-U8 are interconnected between them within the communication network and given that the sender and the recipient(s) are identified in the exchanged messages by means of identifiers Uid, DCid, Pid, therefore messages sent to a specific recipient (e.g. a data concentrator DCid or a provider Pid) can be advantageously re-routed by an alternate recipient to the appropriate recipient. Such a roaming can be performed by an intermediate data concentrator or by a provider that would receive a message (e.g. a utility meter message $DTup_{u,c}$ or utility meter consumption invoicing report message $MRup_{u,c,p}$), whereas it is not the appropriate recipient of this message. Such a roaming can be applied for instance if the message of the sender cannot reach its recipient for many reasons, such as for temporarily maintenance reasons or failure in the communication towards a certain recipient.

In order to simplify future updating and/or other operations directed or performed by the utility management center such as data management billing, the report sent from the data concentrator to the utility management center can further comprises a detailed tariff computation, calculated on the basis of at least one tariffs table similar to that shown in FIG. 2. Typically, such a tariffs table will be established and updated by the utility management center but can be processed or preprocessed by the destination data concentrator.

Alternately, the data concentrator may also send a receipt acknowledgement and/or a retransmission query to the utility meter.

The data concentrator may also further send information about the actual offering and/or invoicing as relevant to the end user, periodically, for instance after reporting consolidation to the utility providers.

The data concentrator may also further send a configuration message to the utility meter to update its reporting rate.

Preferably, all of exchanged messages or reports are secured before to be sent by means of a signature for authenticity and integrity purposes and/or by means of encryption/decryption keys. Providing secured messages/reports involves either their encryption according to a symmetric or a private/public scheme, or the establishing of signature enclosed to the message/report in order to ensure the authenticity and the integrity of sending data. Secured messages/reports can also be obtained by combining signing and encryption processes.

Thus, each time messages or reports have to be exchanged, the method of the present invention performs a step aiming to establish a secure communication respectively for each utility meter U1-U8 connected to the destination data concentrator C1-C4 and for each data concentrator C1-C4 connected to said utility management center P1-P3. This communication being secured by signing and encrypting messages and reports respectively processed by the destination data concentrator C1-C4 and by the utility management center P1-P3. Secured messages and secured reports are processed only if they are identified, on receipt, as being authentic by authentication means.

Accordingly, the method of the present invention could be as follows:

A method for managing utility meter communications within a network comprising a plurality of utility meters (U1-U8) each associated and connected to at least one utility management center (P1-P3) through at least one intermediate data concentrator (C1-C4), each utility meter being identified by a utility meter identifier Uid and being adapted to produce and send secured utility meter messages $DTup_{u,c}$ to a destination data concentrator identified by a data concentrator identifier DCid, each destination data concentrator being adapted to produce and send secured reports to said management center (P1-P3) identified by a management center identifier Pid, said method comprising the steps of:
preparing and sending a secured utility meter message $DTup_{u,c}$ from a utility meter (U1-U8) to said destination data concentrator (C1-C4), said utility meter message $DTup_{u,c}$ including: a metering data measurement DTup reported by said utility meter, said utility meter identifier Uid, said destination data concentrator identifier DCid and said management center identifier Pid,
decrypting and/or verifying the authenticity and the integrity of said secured utility meter message $DTup_{u,c}$ upon receipt by the destination data concentrator (C1-C4); in case of failure or unsuccessful result: interrupting the processing of said data concentrator message,
determining, on the basis of several metering data measurements DTup, a metering counter differential consumption value ΔCPT calculated by difference of two metering counter consumption indexes CPT measured by said utility meter within a time period interval ΔDT,
preparing and sending, from the destination data concentrator towards the utility management center (P1-P3) to which said utility meter is associated, a secured report containing at least said metering counter differential consumption value ΔCPT,
processing said report, upon receipt by the data concentrator, only after having decrypted this report and/or checked its authenticity and its integrity.

The present invention also refers to a system able to implement the above disclosed method. To this end, it suggests a system for managing utility meter communications within a network comprising a plurality of utility meters U1-U8 each associated and connected to at least one utility management center P1-P3 through at least one intermediate data concentrator C1-C4 identified as being a destination data concentrator by an identifier DCid. Each utility meters U1-U8 being identified by a utility meter identifier Uid and each utility management center being identifier by a management center identifier Pid. This system comprising:
connecting means for establishing communications through communication network links Luc connecting the data concentrator to the utility meters associated with this data concentrator, and through communication network links Lcp connecting this data concentrator to the utility management center, preferably to a plurality of utility management centers,
measuring means for determining a metering data measurement DTup by reading a counter consumption index CPT at each utility meter,
means, such as a message generator, for generating utility meter messages $DTup_{u,c}$ within each utility meter U1-U8, each of these utility meter messages comprising: the metering data measurement DTup, the utility meter identifier Uid, the destination data concentrator identifier DCid and the management center identifier Pid,
utility meter sending means for transmitting these utility meter messages $DTup_{u,c}$ to the destination data concentrator,
computing means for determining, on the basis of several metering data measurements DTup, a metering counter differential consumption value ΔCPT calculated by difference of two metering counter consumption indexes CPT measured by the utility meter within a time period interval ΔDT,
data concentrator sending means for transmitting, from the destination data concentrator towards the utility management center P1-P3 to which the utility meter U1-U8 is associated, a report containing at least the metering counter differential consumption value ΔCPT, and
a central processing unit for managing all the aforementioned means.

All of the above-mentioned means can be carried out by specific modules comprising electronic components able to achieve the functions to which each of those modules refer.

According to one embodiment, each utility meter of the system further comprises a clock readable by said measuring means for including a time and date DT to the metering data measurement DTup.

According to another embodiment, the destination data concentrator of the system comprises a memory for collecting, during a reporting period of time ΔRT, a plurality of calculated consumption values ΔCPT before sending them to the proper utility management center, for instance within the report transmitted by the sending means of the data concentrator at the end of the reporting period of time ΔRT.

Preferably, the system of the present invention further comprises security means for securing the communications exchanged, on the one hand, between the utility meters and the destination data concentrator and, on the other hand, between the latter and at least one utility management center associated with these utility meters. Secured communications are carried out by common means, i.e. by signatures and encryption means applied to the utility meter messages $DTup_{u,c}$ sent by the utility meters and to the reports sent by the destination data concentrator. Therefore, the system is provided with means for acquiring public key certificates, means to authenticate these certificates, means for producing session key (typically random session key), means for encrypting and decrypting messages with these keys and means for sending and receiving acknowledgment messages in case of completely successful transmission.

The invention claimed is:

1. A method for managing utility meter communications within a network by a utility management center, the utility management center managing a plurality of utility meters connected through an intermediate data concentrator, the method comprising:
receiving, from the intermediate data concentrator, a report including an identifier of the intermediate data concentrator, a utility provider identifier, at least two metering counter differential consumption values associated with at least two different utility meters, and a corresponding utility meter identifier for each of the at least two different utility meters,
each differential consumption value being determined as a metering counter differential consumption value based on a difference of two metering counter consumption indexes measured by a particular one of the at least two utility meters within a time period interval.

2. The method of claim 1, wherein the receiving step comprises receiving the report, which was signed with a digital signature by the intermediate data concentrator, and the method further includes authenticating the received report.

3. The method of claim 1, wherein the receiving step comprises receiving the report, which was encrypted using an encryption key by the intermediate data concentrator, and the method further includes decrypting the received report.

4. The method of claim 1, wherein the receiving step further comprises receiving, with the report, a management center identifier that identifies an intended recipient of the report, and the method further comprises:
determining, based on the received management center identifier, whether the utility management center is the intended recipient of the report, and
in response to determining that the utility management center is not the intended recipient of the report, transmitting the report to another utility management center corresponding to the received management center identifier.

5. A utility management center for managing utility meter communications within a network, the utility management center managing a plurality of utility meters connected through an intermediate data concentrator, the utility management center comprising:
circuitry configured to receive, from the intermediate data concentrator, a report including an identifier of the intermediate data concentrator, a utility provider identifier, at least two metering counter differential consumption values associated with at least two different utility meters, and a corresponding utility meter identifier for each of the at least two different utility meters,
each differential consumption value being determined as a metering counter differential consumption value based on a difference of two metering counter consumption indexes measured by a particular one of the at least two utility meters within a time period interval.

6. The utility management center of claim 5, wherein the circuitry is further configured to receive the report, which was signed with a digital signature by the intermediate data concentrator, and authenticate the received report.

7. The utility management center of claim 5, wherein the circuitry is further configured to receive the report, which was encrypted using an encryption key by the intermediate data concentrator, and decrypt the received report.

8. The utility management center of claim 5, wherein the circuitry is further configured to
receive, with the report, a management center identifier that identifies an intended recipient of the report,
determine, based on the received management center identifier, whether the utility management center is the intended recipient of the report, and
in response to determining that the utility management center is not the intended recipient of the report, transmit the report to another utility management center corresponding to the received management center identifier.

* * * * *